April 23, 1968  J. H. BAUSCHARD  3,379,400

BATTERY HOLD DOWN CLIP

Filed May 9, 1966

INVENTOR
JOHN H. BAUSCHARD
BY Charles L. Lovercheck
attorney

United States Patent Office 3,379,400
Patented Apr. 23, 1968

3,379,400
BATTERY HOLD DOWN CLIP
John H. Bauschard, 316 E. 28th St.,
Erie, Pa. 16504
Filed May 9, 1966, Ser. No. 548,699
3 Claims. (Cl. 248—361)

ABSTRACT OF THE DISCLOSURE

The invention disclosed herein is a battery hold down clip made of a single resilient sheet-like member. The sheet member is bent generally in L-shape with a flange and a shank extending at an acute angle of approximately seventy-five degrees to each other. The distal ends of both the shank and the flange are bent toward each other. A slot is formed in the flange, and a battery hold down rod extends through this slot. Thus, the bent distal end of the flange may engage the top of the battery and the bent distal end of the shank may engage the hold-down rod, so that the bent end of the shank engages the hold down rod and this holds the bent end of the flange in engagement with the battery.

---

This invention relates to clips and, more particularly, to clips for clamping a battery in an automobile battery case or the like.

The clip disclosed herein is designed for use to hold down batteries in automobiles, trucks, tractors, and other power vehicles. It is to be used in combination with battery cases having hold down rods for securing the batteries.

The clip is made from sheet steel of, for example, twenty gauge medium carbon steel, cold rolled with proper temper to give lasting shape to the bent parts, and also to result in a spring action between the shank and the flange. The clips may be finished by plating with a commercial tinning or other acid resisting coating. The slot in the flange is shaped to accommodate a hold down rod of approximately three-eighth inch diameter and the clip will accommodate batteries having wall thicknesses or cap margin up to one-half inch wide, for example, in the preferred form disclosed. The rod can be a size suitable for the purpose.

When used with batteries having mastic tops, the lip of the flange embeds itself in the mastic. Batteries having hard rubber or plastic cases will need some minor modifications. When the clip is in operation, the hold down rod and washer should be pressed close to the battery wall with the lip or shank of the clip bearing against the rod. As the nut on the rod is forced downward, the flange of the clip is forced down to a position level with the top of the battery and a pressure of approximately sixteen pounds can be exerted on the battery, as a result that an upward thrust is exerted by the clip which prevents the sagging of the overhanging parts of the clip. At the same time, a pressure of the lip at the bottom of the shank against the rod will be approximately 3¼ pounds in the embodiment disclosed. The angle between the top of the clip and the shank is approximately 75° when the clip is free. When the clip is compressed as shown, the angle widens to 80°. When the nut is forced down to a firm level position, it will not be necessary or advisable to use extreme additional pressure. The lip at the bottom of the shank is primarily for the purpose of preventing capillary action of the flat surface during the plating process.

It is, accordingly, an object of the present invention to provide an improved battery clip.

Another object of the invention is to provide a battery clip which is simple in construction, economical to manufacture, and simple and efficient to use.

Still another object of the invention is to provide an improved battery clip in combination with a battery and clamping rod.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
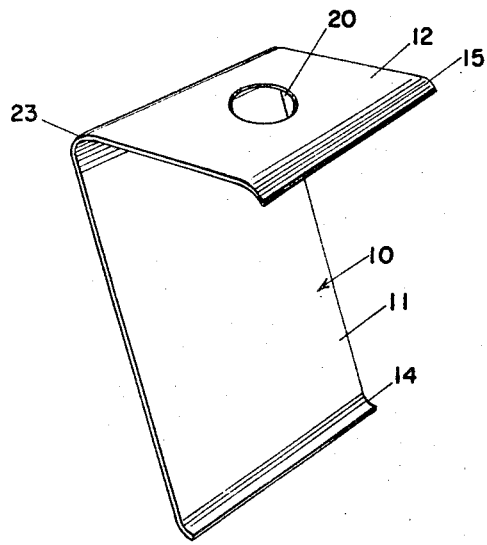
FIG. 1 is an isometric view of a battery clip according to the invention.
Figure 2:
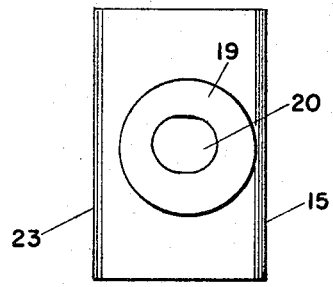
FIG. 2 is a top view of the clip shown in FIG. 1.

Now with more particular reference to the drawing, the battery clip generally indicated at 10 has a shank 11 which is integrally connected to the flange 12 formed by bending a piece of sheet metal at 23 and forming the lips 14 and 15 as shown. The rod 16 is of the type familiar to those skilled in the art which is used to clamp batteries in battery cases and it is threaded at 17 and has a wing nut 18 threadably received thereon above a washer 19. An oval slot 20 is formed in the flange 12. A notch 21 is of the type formed in batteries adjacent the edge of the battery and receives a lip 15.

Figure 3:
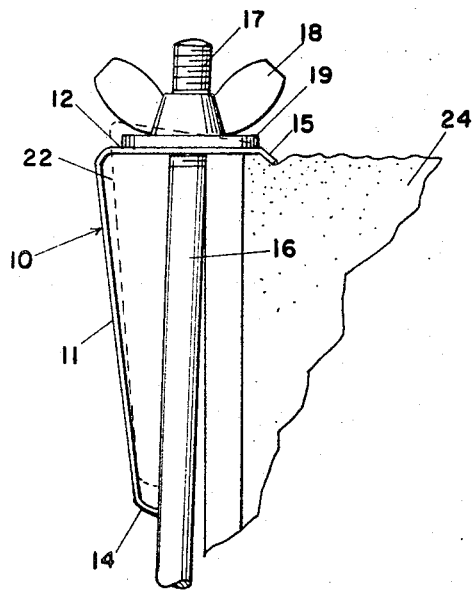
FIG. 3 is a side view of the clip shown in FIG. 1 mounted on a battery.

When the nut 18 is tightened up as shown in FIG. 3, the clip will spring down from the dotted line position 22 to the full line position. Thus, it will be seen that the battery 24 will be clamped into battery cases by the clip as shown.

Figure 4:
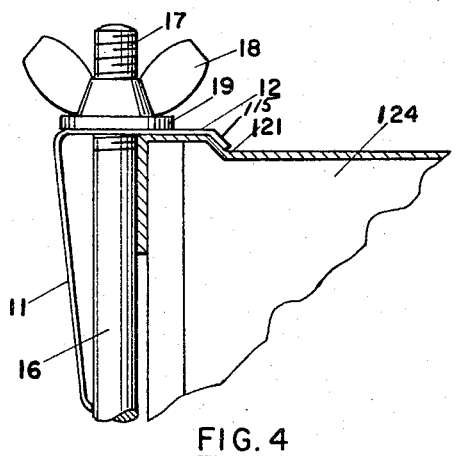
FIG. 4 is a view similar to FIG. 3 showing the clip supported with a different kind of battery.

In the embodiment of the invention shown in FIG. 4, the clip 11 and the hold down rod 16 are shown, identical to those shown in the previous embodiment. The battery 124, however, has a shoulder 121, which receives the lip 115 of the clip.

Figure 5:
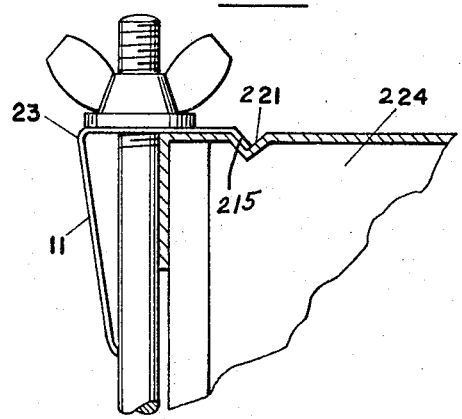
FIG. 5 is a view similar to FIGS. 3 and 4 showing the clip supported on yet another kind of battery.

In the embodiment of the invention shown in FIG. 5, the battery 224 has a notch 221, which receives the lip 215 of the clip.

Figure 6:
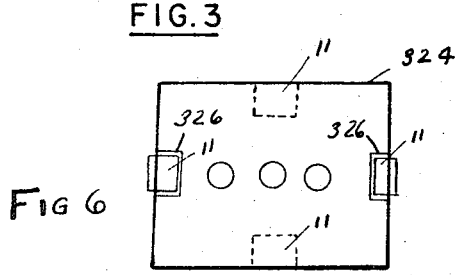
FIG. 6 is a top view of a battery showing the clip supported thereon according to the invention.

In the embodiment of the invention shown in FIG. 6, the battery 324 has pads 326 on opposite sides thereof, which form raised support surfaces for the clip 11. The lips of the clips may overlie the inner ends of the pads 326 in the manner the lips 115 overlie the inclined shoulders in the embodiment shown in FIG. 4. Additional pads may be supported along the sides of the battery as shown in dotted lines 11 in FIG. 6.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A battery hold down clip made of single resilient sheet like material comprising
   a flat shank member,
   a flange member disposed at an acute angle to said shank member and integrally attached thereto, the distal end of said shank member being bent in the same direction relative to said shank as said flange thereby forming a first lip, the distal end of said flange member being bent relative to said shank member generally in the same direction as said shank member is to said flange thereby forming a second lip, and a slot in said flange member, said flange member being adapted to overlie a part of a battery with said first lip engaging said battery, said second lip being adapted to engage a hold down rod, said slot being adapted to receive a threaded end of said hold down rod.

2. The clip recited in claim 1 wherein said clip is disposed in combination with said battery, said hold down rod extends through said slot, said end of said shank member engages said rod, said first lip is disposed in a slot in said battery, a nut is disposed on said threaded end of said bolt exerting a force on said flange member whereby said first lip is forced down relative to said rod, and said flange member moved outward relative to said rod whereby said battery is forced into engagement with said rod and said flange member is bent relative to said shank member.

3. The combination recited in claim 2 wherein said flange is disposed at approximately 75 degrees to said shank in its free position, said flange is disposed at approximately 80 degrees to said flange in its clamped position.

References Cited

UNITED STATES PATENTS

| | | | |
|---|---|---|---|
| 783,099 | 2/1905 | Bryant | 248—361 |
| 2,613,755 | 10/1952 | Newby et al. | 280—68.5 |
| 2,768,805 | 10/1956 | Gribble | 248—361 |
| 2,925,137 | 2/1960 | Harper | 180—68.5 |
| 2,994,395 | 8/1961 | Hall | 180—68.5 |

ROY D. FRAZIER, *Primary Examiner.*

FRANK DOMOTOR, *Assistant Examiner.*